(No Model.)
G. B. PRESCOTT, Jr.
DISTRIBUTION OF ELECTRICITY BY SECONDARY BATTERIES.
No. 418,748. Patented Jan. 7, 1890.
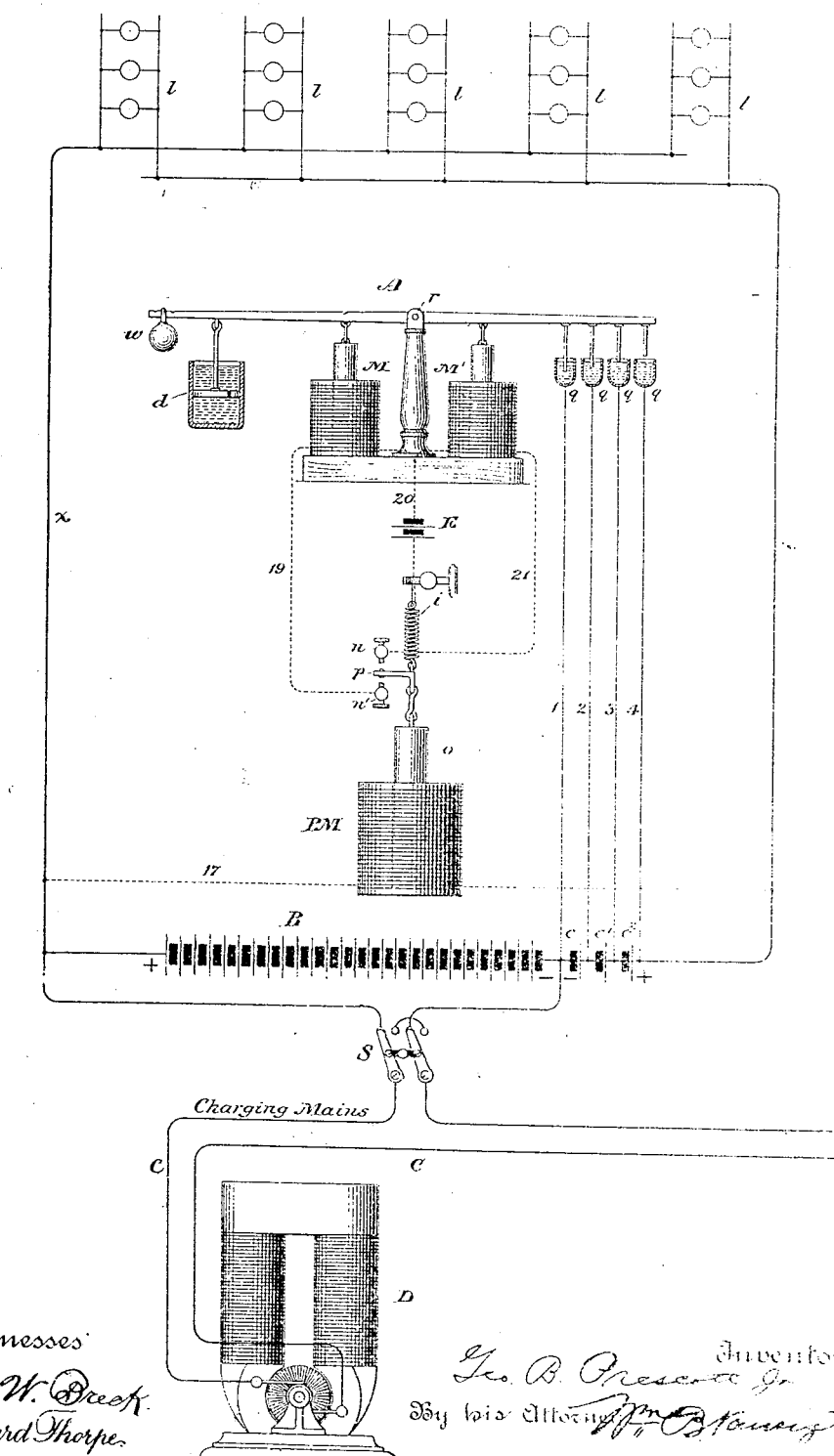
Witnesses
Geo. W. Breck
Edward Thorpe
Inventor
Geo. B. Prescott Jr.
By his Attorney

United States Patent Office.

GEORGE B. PRESCOTT, JR., OF NEWARK, NEW JERSEY, ASSIGNOR TO THE ELECTRICAL ACCUMULATOR COMPANY, OF NEW YORK, N. Y.

DISTRIBUTION OF ELECTRICITY BY SECONDARY BATTERIES.

SPECIFICATION forming part of Letters Patent No. 418,748, dated January 7, 1890.

Application filed November 8, 1889. Serial No. 329,667. (No model.)

*To all whom it may concern:*

Be it known that I, GEORGE B. PRESCOTT, Jr., a citizen of the United States, and a resident of Newark, in the county of Essex and State of New Jersey, have invented certain new and useful Improvements in the Distribution of Electricity by Secondary Batteries, of which the following is a specification.

My invention is an improvement in the distribution of electricity by secondary batteries.

The invention contemplates the use of a primary generator of electricity located at a central station, and one or more sub-stations, at each of which there is located a secondary battery and a working-circuit to be supplied thereby. The main and sub stations are to be connected by two or more main leads, called the "charging-circuit." In this arrangement of apparatus, when the dynamo is being operated to charge the battery at any given station and the working-circuit is simultaneously supplied from the battery, it happens that the excessive electro-motive force necessarily employed to charge the battery is manifest and is injuriously active in the working-circuit. My invention is designed to obviate this difficulty by the employment of apparatus automatically operative; and it most particularly relates to the construction and arrangement of apparatus by which the result is accomplished.

In a circuit connecting opposite terminals of the working-circuit I place an electro-magnet of high resistance, responsive to variations in electro-motive force. This is preferably in the form of a solenoid, and controls the local circuit operating the switch. In position to be inserted and withdrawn with respect to the working-circuit I place a series of cells yielding a counter electro-motive force and having small storage capacity. The switch or circuit-changer consists of a balanced bar having a series of contact-points operating in a series of fixed mercury-cups. This forms the means for inserting and removing the counter electro-motive-force cells with respect to the working-circuit. This switch-bar is upon a friction-bearing, so arranged that the bar will remain in any position to which it is moved or in which it is placed until again positively moved by suitable electro-magnetic devices in the local circuit.

The accompanying drawing illustrates my invention.

D is a dynamo-electric machine located at a central station. It is connected by charging-mains C C with one or more sub-stations. At each sub-station there is a secondary battery B and a switch S for cutting it in and out of the charging-mains.

Battery B supplies a working-circuit $x$ $x$, containing lamps I. In the working-circuit there is a series of counter electro-motive-force cells $c$ $c'$ $c^2$, under control of the switch A, operating through tap-wires 1, 2, 3, and 4.

PM is an electro-magnetic device responsive to variations in electro-motive force, located in a circuit 17, connecting opposite leads of the working-circuit $x$ at a point of average potential.

A is a switch-bar suitably supported on a friction-bearing at $r$, so that it will retain whatever angular position it is placed in. There is a dash-pot $d$ for rendering its movement sluggish, and a weight $w$ for imparting a delicate balance to the bar. There is a solenoid magnet M, having its core attached to bar A on one side of its support, and there is a similar magnet M', having its core similarly attached to bar A on the opposite side of its support.

$q$ $q$ $q$ are fixed mercury-cups forming terminals for the tap-wires 1 2 3 4, and into which the electrical contact-points on the end of bar A dip.

The core-armature $o$ of magnet PM carries a contact-point $p$, and is attached to an adjustable retractile spring $i$. Contact-point $p$ has limiting-stops consisting of the fixed electrical contacts $n$ and $n'$. Local battery E is in a wire 20, connected with contact-point $p$. Wire 21 connects contact-point $n$ with return-wire 20 and includes the coils of magnet M' in its circuit. Wire 19 connects contact-point $n'$ with return-wire 20 and includes the coils of magnet M in its circuit.

As shown in the drawings, battery B is receiving charge from the mains C C, and the working-circuit $x$ $x$ is being also supplied with electrical energy. The electro-motive force at the terminals of battery B, due to the charging-current, is greater than the normal electro-motive force of the battery. This excess of electro-motive force has caused the magnetic device PM to draw down armature-core $o$, making contact between $p$ and $n'$, closing local circuit via E, 20, M, 19, $n'$, and $p$, thus causing M to draw down bar A until the contact-point at the extreme right end of bar A leaves mercury-cup $q$, thus breaking the short circuit around counter electro-motive-force cell $c^2$. This immediately lowers the difference of potential at the terminals of circuit 17 to approximately the normal amount, and the contact between $p$ and $n'$ is immediately broken, $p$ again taking its normal or midway position, and the switch-arm A, owing to its frictional bearing, maintaining the position to which the operation carried it. Should the electro-motive force again rise, precisely the same operation is repeated, resulting in the introduction of a second counter electro-motive-force cell $c'$ and the return of contact $p$ to a normal position when normal conditions are restored. Should the charging-current be removed or the difference of potential at the terminals of current 17 drop for any reason, contact-point $p$ is retracted by the spring $i$ acting against the force exerted by magnetic device PM, and circuit is closed via E, 20, M', 21, $n$, and $p$, and magnet M' attracts its end of switch-bar A. When the equilibrium is again restored by thus cutting out one or more counter electro-motive-force cells, the parts resume the position substantially as shown, and the electro-motive force in the working-circuit is thus automatically maintained substantially uniform.

It has been assumed in describing the operation of this apparatus that the variations of potential at the lamp terminals are due to the operations of the charging-generator; but the same variations may be produced by variations of load in the working-circuits, and whenever variations due to this or other causes are apparent my arrangement of apparatus is equally efficient in automatically restoring normal conditions.

What I claim, and desire to secure by Letters Patent, is—

1. The combination of a primary generator of electricity, a secondary battery, a working-circuit therefor, a series of counter electro-motive-force cells, an electro-magnetic switch or circuit-changer for introducing and withdrawing said cells with respect to the working-circuit, consisting of a bar pivoted upon a friction-bearing, a magnet for moving said bar in one direction, a magnet for moving said bar in the opposite direction, a magnet in a circuit connected to opposite terminals of the working-circuit responsive to variations in electro-motive force, and a local circuit operating the two first-named magnets under control of the second-named magnet, substantially as described.

2. The combination of a source of electricity, a working-circuit therefor, a series of counter electro-motive-force cells, an electro-magnetic switch or circuit-changer for varying the position of such cells with respect to said working-circuit, consisting of a bar pivoted upon a friction-bearing, a magnet for moving said bar in one direction, a magnet for moving said bar in the opposite direction, a magnet in a circuit connected to opposite terminals of the working-circuit, responsive to variations in electro-motive force, and a local circuit operating the two first-named magnets and controlled by the second-named magnet, substantially as described.

3. The combination of a source of electricity, a working-circuit therefor, a series of counter electro-motive-force cells, an electro-magnetic switch or circuit-changer for varying the position of such cells with respect to said working-circuit, consisting of a bar pivoted upon a friction-bearing, a dash-pot device, a magnet for moving said bar in one direction, a magnet for moving said bar in the opposite direction, a magnet in a circuit connected to opposite terminals of the working-circuit, responsive to variations in electro-motive force, and a local circuit operating the two first-named magnets and controlled by the second-named magnet, substantially as described.

Signed at the city of New York, in the county of New York and State of New York, this 6th day of November, A. D. 1889.

GEO. B. PRESCOTT, JR.

Witnesses:
V. G. SCHAUMBURG,
DANIEL E. DELAVAN.